US009544060B2

(12) United States Patent
Le Taillandier De Gabory

(10) Patent No.: US 9,544,060 B2
(45) Date of Patent: Jan. 10, 2017

(54) OPTICAL TRANSMITTER AND METHOD FOR CONTROLLING THE SAME

(75) Inventor: Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/387,109

(22) PCT Filed: Mar. 22, 2012

(86) PCT No.: PCT/JP2012/058283
§ 371 (c)(1),
(2), (4) Date: Sep. 22, 2014

(87) PCT Pub. No.: WO2013/140634
PCT Pub. Date: Sep. 26, 2013

(65) Prior Publication Data
US 2015/0050030 A1   Feb. 19, 2015

(51) Int. Cl.
*H04B 10/50* (2013.01)
*H04B 10/564* (2013.01)
*H04B 10/516* (2013.01)

(52) U.S. Cl.
CPC ...... *H04B 10/564* (2013.01); *H04B 10/50595* (2013.01); *H04B 10/516* (2013.01)

(58) Field of Classification Search
CPC ............................................. H04B 10/50595
See application file for complete search history.

(56) References Cited

U.S. PATENT DOCUMENTS

| 7,773,283 | B2 | 8/2010 | Tanaka et al. |
| 8,095,018 | B2 | 1/2012 | Sekine et al. |
| 8,400,702 | B2 | 3/2013 | Tanaka et al. |

(Continued)

FOREIGN PATENT DOCUMENTS

| EP | 2042913 | 1/2009 |
| JP | 2007-133176 | 5/2007 |
| JP | 2008-124893 | 5/2008 |
| JP | 2008-236512 | 10/2008 |
| JP | 2008-249848 | 10/2008 |
| JP | 2010-243953 | 10/2010 |
| JP | 2012-042796 | 3/2012 |

OTHER PUBLICATIONS

Japanese Office Action for Application No. 2014-543651 dated Mar. 8, 2016 (partial English translation).

(Continued)

*Primary Examiner* — Shi K Li
(74) *Attorney, Agent, or Firm* — Young & Thompson

(57) ABSTRACT

Since it is difficult to control correctly and optimally the DC biases of an IQ modulator driven with pre-equalized data, a method for controlling an optical transmitter according to an exemplary aspect of the invention includes the steps of (a) making direct current biases for driving children Mach-Zehnder modulators of an IQ modulator in the optical transmitter converge to values close to null driving points of the children Mach-Zehnder modulators, (b) driving the children Mach-Zehnder modulators with special driving data including a pair of training patterns between which there is a significant correlation, (c) scanning direct current biases for setting quadrature angle of the IQ modulator, (d) monitoring output of the IQ modulator during step (c), and (e) setting the direct current bias for setting quadrature angle on the basis of the driving data and monitored results in step (d).

6 Claims, 9 Drawing Sheets

(56) References Cited

U.S. PATENT DOCUMENTS

| | | | | |
|---|---|---|---|---|
| 2004/0028418 A1* | 2/2004 | Kaplan | ................... | G02F 1/225 |
| | | | | 398/188 |
| 2007/0206954 A1 | 9/2007 | Fishman et al. | | |
| 2010/0128336 A1* | 5/2010 | Witzens | ................ | G02F 1/0123 |
| | | | | 359/239 |
| 2011/0255876 A1* | 10/2011 | Sugihara | ............ | H04B 10/5053 |
| | | | | 398/188 |
| 2012/0250793 A1* | 10/2012 | Khatana | ................ | H04L 27/364 |
| | | | | 375/308 |

OTHER PUBLICATIONS

International Search Report for International Application No. PCT/JP2012/058283 dated Jun. 2, 2013.

Tsuyoshi Yoshida et al: "A Study on Automatic Bias Control for Arbitrary Optical Signal Generation by Dual-Parallel Mach-Zehnder Modulator", 36th European Conference and Exhibition on Optical Communication : (ECOC 2010) ; Torino, Italy, Sep. 19-23, 2010, IEEE, Piscataway, NJ, USA, Sep. 19, 2010 (Sep. 19, 2020), pp. 1-3, XP031789670, ISBN: 978-1-4244-8536-9 the whole document.

Hiroto Kawakami: "Auto bias control technique for optical 16-QAM transmitter with asymmetric bias dithering", Optics Express, vol. 19, No. 26, Nov. 18, 2011 (Nov. 18, 2011), XP055050860, 1. Introduction; figure 1.

S. J. Savory, "Digital filters for coherent optical receivers", Optics Express, vol. 16, No. 2, pp. 804-817 (2008).

E. Yamazaki et al., "Fast optical channel recovery in field demonstration of 100-Gbit/s Ethernet over OTN using real-time DSP", Optics Express, vol. 19, No. 14, pp. 13179-13184 (2011).

* cited by examiner

OPTICAL TRANSMITTER AND METHOD FOR CONTROLLING THE SAME

TECHNICAL FIELD

The present invention relates generally to optical communications technologies, in particular, to an optical communication technology where pre-equalization, i.e. compensation of all or one part of the impairments occurring during transmission, is performed at an optical transmitter.

BACKGROUND ART

Digital Signal Processing (DSP) techniques enable an optical transmitter to compensate the impairments affecting optical signal during transmission over a fiber by applying the inverse filter properties of the impairments. These techniques can be applied at two different stages of a transmission system including a transmitter and a receiver respectively transmitting and receiving a light wave signal through a medium, such as an optical fiber.

In the first way, the implementation of the DSP technique is performed at the receiver. Notably, a coherent reception technology enables the receiver to get the information on both phase and amplitude of the received signal. This will allow the DSP to compensate for impairments occurring during transmission before the reception by utilizing appropriately calculated filters. An example of signal equalization in this configuration is illustrated in the non patent literature 1 (NPL1). Furthermore, the equalization based on DSP can be implemented in a signal processor as described in the non patent literature 2 (NPL2).

In another way, the implementation of the DSP technique for equalization is performed at the transmitter. The equalization at the transmitter can be either called pre-distortion, pre-equalization, or pre-compensation depending on the sources. This will allow the DSP to compensate for impairments occurring during transmission after emission of the pre-equalized signal by utilizing appropriately calculated filters. The transmitter emits therefore signal that has been distorted in both amplitude and phase information according to the filters, in order to compensate for the signal with the impairment occurring during transmission in the medium. The non patent literature 3 (NPL3) discloses an example of pre-equalization technique, where both linear impairments like chromatic dispersion (CD) and non-linear impairments like Self Phase Modulation (SPM) are compensated in this manner. The pre-equalization with a DSP enables the transmitter to perform equalization in a more economic way than with a dedicated processor. Alternatively, pre-equalization enables to extend the compensating range of the receiver by adding the compensation range of the transmitter.

In NPL3, the pre-equalized signal is modulated on the optical carrier with an optical IQ modulator (In phase—Quadrature phase modulator), sometimes called Cartesian modulator, vector modulator, Dual Parallel modulator, or nested modulator depending on the sources. In an IQ modulator, the electric signals drive two independent Mach-Zehnder devices, which can be called children Mach-Zehnder Modulators (MZM), or nested MZM depending on the sources. The children MZM modulate the phase and amplitude of the same optical carrier wave. The phase in one of their outputs is relatively delayed by 90 degrees before being recombined. The phase delay between the outputs of the children MZM can be called an angle of quadrature and is ideally 90 degrees, modulo 180 degrees. IQ Modulators enable a chirp-free modulation for the amplitude and phase information in the pre-equalized signal by accessing directly to the I component and the Q component of the light wave signal.

However, it is known that there is a drift of DC (Direct Current) bias in IQ modulators due to variation of the temperature or ageing of the device. There are three types of applied biases, that is, the DC biases of each of the two children MZM and DC bias used to set the angle of quadrature. The drift of DC (Direct Current) bias causes a degradation of the transmitted signal, and therefore results in degradation of the received signal quality or in worst cases the impossibility to decode the received signal. This problem is likely to be revealed in the characterization tests of the modulator at the production stage or at the assembly stage of the transmitter in which the modulator is used. This problem can be solved by using Auto Bias. Control (ABC) circuits, which control the biases of the modulators and compensate for the DC bias change. In this manner, ABC technology can manage the drift of DC bias of IQ modulators, enabling correct modulation in optimal condition.

An example of ABC circuits, which is able to control the DC biases of an IQ modulator driven with multilevel signals in order to generate QAM modulated optical signal, is disclosed in the patent literature 1 (PTL1). The ABC circuit of PTL1 is based on low frequency dither tones to control the DC biases of I and Q components in the children MZM as well as of the angle of quadrature. However, due to the properties of the monitor signal, the optimal DC biases of the children MZM have a periodicity of 2*Vpi, where Vpi is the voltage difference between the biases corresponding to constructive interferences and destructive interferences of the MZM. Similarly, the optimal quadrature angle has a periodicity of 180 degrees. Because of these periodicities, there is an uncertainty of 2*Vpi on the set of DC biases in the children MZM and an uncertainty of 180 degrees of the quadrature angle in the IQ modulator.

Another example of ABC circuits, which is capable of controlling the three biases of an IQ modulator driven with pre-equalized data for pre-equalization of CD, is reported in the non patent literature 4 (NPL4). According to the design of ABC circuits including the example in NPL4, the optimal point for the DC biases of the children MZM is the point of minimum transmission at Vpi, where a phase difference of 180 degrees is created by the DC bias between two arms of the children MZM. The optimal bias point is periodic by 2*Vpi. The angle of quadrature is periodic by 180 degrees. According to these periodicities, there is an uncertainty of 2*Vpi on the set of DC biases in the children MZM and an uncertainty of 180 degrees of the quadrature angle in the IQ modulator.

The output complex field representing the lightwave signal modulated by an IQ modulator can be expressed by the following equation:

$$E_{out}(t, V_{bias,I}, V_{bias,Q}, \varphi_{IQ}) = \frac{E_0(t)}{2} \left[ \cos\left(\frac{\pi}{2} \times \frac{V_{RF,I}(t) + V_{bias,I}}{V_\pi}\right) + e^{j\varphi_{IQ}} \times \cos\left(\frac{\pi}{2} \times \frac{V_{RF,Q}(t) + V_{bias,Q}}{V_\pi}\right) \right] \quad (1)$$

where $E_{out}(t)$ represents the output complex field, $E_0(t)$ is proportional to the complex field of the input lightwave signal of the IQ modulator, $V_{bias,I}$ represents the DC bias of the I child MZM in the IQ modulator, $V_{bias,Q}$ represents the DC bias of the Q child MZM in the IQ modulator, $\phi_{IQ}$ is the angle of quadrature of the IQ modulator, $V_{RF,I}(t)$ represents a driving voltage of I child MZM in the IQ modulator, $V_{RF,Q}(t)$ represents a driving voltage of Q child MZM in the IQ modulator, and $V_\pi$ represents a voltage difference between the biases corresponding to constructive interferences and destructive interferences in the children MZM. In this convention, the case $V_{bias,I}=V_\pi$ represents biasing at the null driving point of the child I Mach-Zehnder modulator.

Considering the case of an IQ modulator, with optimal DC biases, the output complex field is as follows:

$$E_{out,optimal}(t) = E_{out}(t, V_\pi, V_\pi, 90) \qquad (2)$$

where the DC biases of the MZM children are set at Vpi and the angle of quadrature of the IQ modulator is set at 90 degrees.

Referring to the ambiguity of the optimal DC biases set by an ABC circuit controlling the IQ modulator, the following cases are also optimal considering the DC biases of the IQ modulator:

$$E_{out}(t, 3 \times V_\pi, V_\pi, 90) = -\overline{E_{out,optimal}(t)} \text{ (Opposite of the complex conjugate of (2)),} \qquad (3)$$

$$E_{out}(t, V_\pi, 3 \times V_\pi, 90) = \overline{E_{out,optimal}(t)} \text{ (Complex conjugate of (2)),} \qquad (4)$$

$$E_{out}(t, V_\pi, V_\pi, 270) = \overline{E_{out,optimal}(t)} \text{ (Complex conjugate of (2)),} \qquad (5)$$

In the case of modulation of signal with QPSK or QAM format with the IQ modulator, depending on the DC bias set by the ABC circuit and considering the uncertainty of the set DC bias, the output field is susceptible to a reference output filed such as its opposite, its complex conjugate, or the opposite of its complex conjugate. The uncertainty of the state can be easily resolved at the receiver after symbol decision using training pattern or framing information.

CITATION LIST

Patent Literature

PTL1: Japanese Patent Application Laid-Open Publication No. 2008-249848
PTL2: Japanese Patent Application Laid-Open Publication No. 2008-124893

Non Patent Literature

NPL1: S. J. Savory, "Digital filters for coherent optical receivers", Optics Express, Volume 16, No. 2, pages 804-817 (2008).
NPL2: E. Yamazaki et al., "Fast optical channel recovery in field demonstration of 100-Gbit/s Ethernet over OTN using real-time DSP", Optics Express, Volume 19, No. 14, pages 13179-13184 (2011).
NPL3: K. Roberts et al., "Electronic Precompensation of Optical Nonlinearity", IEEE Photonics Technology Letters, Volume 18, No. 2, pages 403-405 (2006).
NPL4: T. Yoshida et al., "A Study on Automatic Bias Control for Arbitrary Optical Signal Generation by Dual-Parallel Mach-Zehnder Modulator", European Conference on Optical Communications 2010 (ECOC 2010, paper Tu.3.A.6).

SUMMARY OF INVENTION

Technical Problem

In the case of an IQ modulator driven by electrical data processed with pre-equalization function, the complex field emitted by the IQ modulator is equalized by the properties of the medium after the modulator. For instance, in the case of pre-equalization of chromatic dispersion "d" of a fiber transmission line, pre-equalization of "−d" can be applied in the frequency domain by the following filter characteristic:

$$H(\omega, -d) = e^{-j\frac{\lambda^2}{4\pi c}d(\omega-\omega_0)^2} \qquad (6)$$

where ω represents a frequency, $\omega_0$ represents the central frequency, d represents the value of the chromatic dispersion of the fiber transmission line to pre-equalize, c represents the velocity of light, and λ represents the wavelength of the lightwave signal.

In this example, if the signal is emitted by the IQ modulator according to the conditions of (2), the chromatic dispersion in the fiber is equalized by the pre-equalized data processed in the transmitter, and then the residual chromatic dispersion after transmission becomes null. However, if the IQ modulator is set according to (3), (4), or (5), the emitted signal will no longer be equalized according to H(ω), but instead by the complex conjugate of H(ω), it will be equalized. Accordingly, the residual chromatic dispersion after transmission through the fiber will no longer become null, but instead becomes 2d which is twice the value of the chromatic dispersion in the fiber. In the latter cases of (3), (4), or (5), the quality of the received signal is lowered. Alternatively, if the chromatic dispersion that can be compensated by the receiver is lower than 2d, the signal reception is no longer possible.

An example of a transmitter equipped with pre-equalization of chromatic dispersion is disclosed in the patent literature 2 (PTL2). The chromatic dispersion in the transmission fiber is pre-equalized at the transmitter. If the receiver is unable to receive correctly the data, the receiver requests the transmitter using the network control plane to change the conditions of driving for or the pre-equalization of the modulator in the transmitter. According to the patent literature 2 (PTL2), even though the uncertainties of the control of the IQ modulator cause an incorrect pre-equalization, those cases can be corrected. However, the solution proposed in the patent literature 2 (PTL2) requires a long time because the receiver has to determine if the signal can be received and pass the information to the transmitter through another channel of the network. Since short startup time of the transmitter embedded in transponders is desirable, the solution by the patent literature 2 (PTL2) needs to be improved.

Furthermore, even if the receiver can compensate for twice the chromatic dispersion in the transmission line, the solution by the patent literature 2 (PTL2) is unable to detect the signals in the cases where the transmitter is not correctly set and the compensation of the receiver is not optimally performed. Those conditions limit the tolerance of the receiver to changing conditions which cause possible errors after network operation.

Moreover, the use of control plane or monitoring channels to transmit orders from the receiver to the transmitter needs extra bandwidth in the network. Therefore, this is not an optimal solution in view of network bandwidth utilization.

As mentioned above, there is a need for improvement of ABC circuits or of a system to remedy the uncertainties of ABC circuits to control an IQ modulator driven with pre-equalized data.

An exemplary object of the invention is to provide an optical transmitter and method for controlling the same that include a fast, bandwidth effective control system for the DC biases of an IQ modulator driven with data generated by pre-equalization function.

Solution to Problem

A method for controlling an optical transmitter according to an exemplary aspect of the invention includes the steps of (a) making direct current biases for driving children Mach-Zehnder modulators of an IQ modulator in the optical transmitter converge to values close to null driving points of the children Mach-Zehnder modulators, (b) driving the children Mach-Zehnder modulators with special driving data including a pair of training patterns between which there is a significant correlation, (c) scanning direct current biases for setting quadrature angle of the IQ modulator, (d) monitoring output of the IQ modulator during step (c), and (e) setting the direct current bias for setting quadrature angle on the basis of the driving data and monitored results in step (d).

An optical transmitter according to an exemplary aspect of the invention includes an IQ modulator provided with children Mach-Zehnder modulators, an auto bias control circuit making direct current biases for driving the children Mach-Zehnder modulators converge to values close to null driving points of the children Mach-Zehnder modulators, a data selector selecting special driving data including a pair of training patterns between which there is a significant correlation, for driving the children Mach-Zehnder modulators, a scan circuit scanning direct current biases for setting quadrature angle of the IQ modulator, a monitor photo diode monitoring output of the IQ modulator during scanning direct current biases for setting the quadrature angle, and a control circuit setting the direct current bias for setting the quadrature angle on the basis of the driving data and results monitored by the monitor photo diode.

Advantageous Effects of Invention

An exemplary advantage according to the invention provides an optical transmitter and method for controlling the same that can control an IQ modulator which emits a lightwave signal modulated with pre-equalized data so that the pre-equalized data matches the properties of the transmission medium, in spite of the uncertainties of the control biases of the IQ modulator.

DESCRIPTION OF EMBODIMENTS

First Exemplary Embodiment

Figure 1:
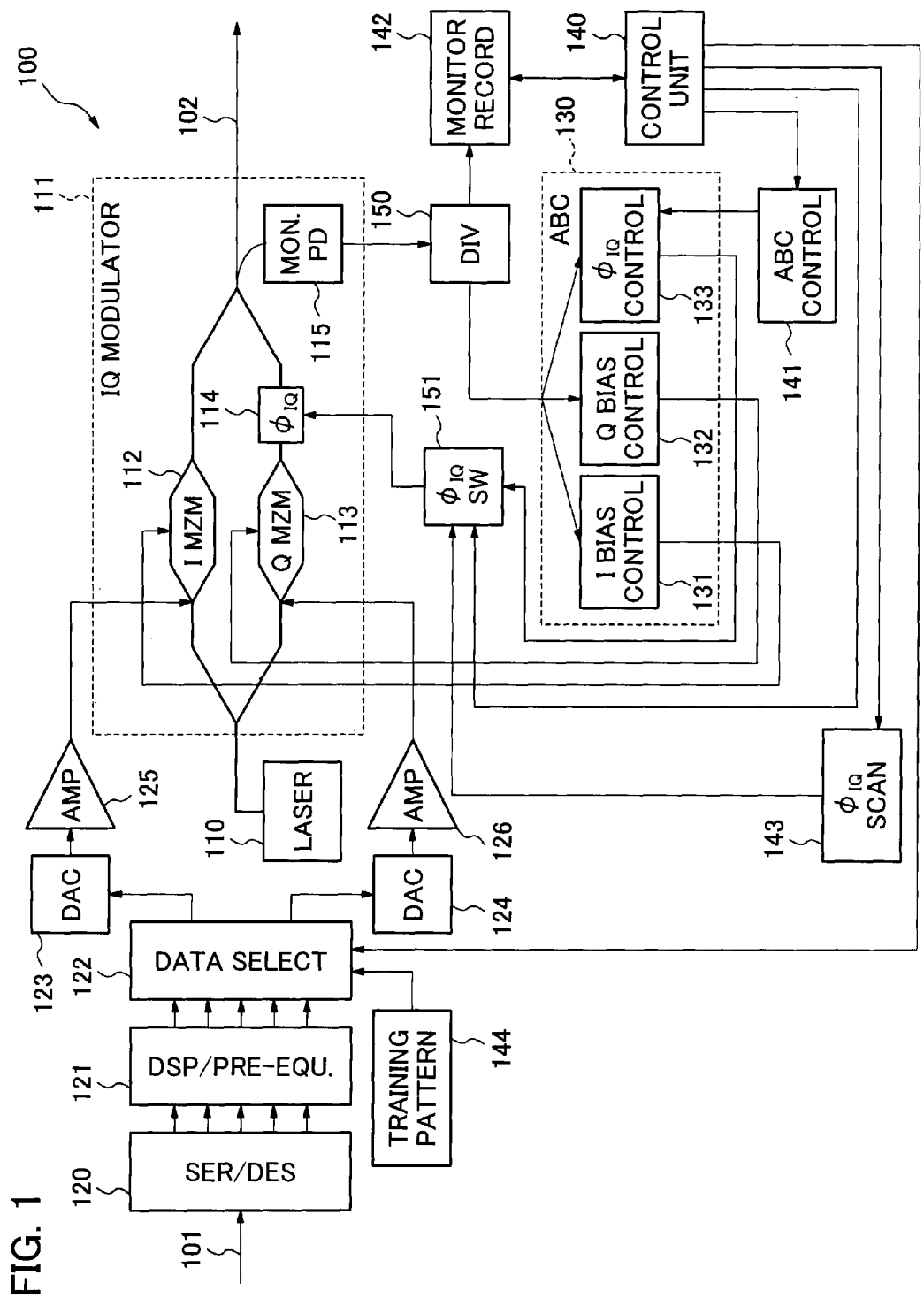
FIG. 1 is a schematic representation of an optical transmitter according to the first exemplary embodiment.

FIG. 1 is a schematic representation of an optical transmitter 100 including an IQ modulator 111 and an Auto Bias Control (ABC) circuit 130. The optical transmitter 100 emits a lightwave signal 102 modulated by the IQ modulator 111 according to logical binary data stream 101. A serializer/deserializer 120 transforms the logical binary data stream 101 into parallel lanes of binary data so that they can be processed by a Digital Signal Processing unit (DSP) 121. The data processed by the DSP 121 are fed into a data selector 122. The data selector 122 also receives a training pattern generated by a training pattern generator 144.

The training pattern generator 144 generates training patterns as driving data for two lanes with the condition that the correlation between two training patterns is non-null. That is to say, there is a significant correlation between a pair of training patterns. For instance, two training patterns can be equals to an arbitrary pattern. Alternatively, the training patterns can be chosen as constant. Alternatively, one of the training patterns can be arbitrarily chosen and the other one is the opposite of the first one. Alternatively, one of the training patterns can be arbitrarily chosen and the other one is proportional to the first one.

According to the control signal emitted by a general control unit 140, the output of the data selector 122 is generated from either the signal generated by the DSP 121 or by the training pattern generator 144. Alternatively, the data selector 122 and the training pattern generator 144 can be integrated with the DSP 121. The DSP 121 generates data by which to modulate continuous wave light from a laser 110 according to the binary data 101 and the modulation format of the optical transmitter 100. The modulation format can be multilevel format such as Quadrature Phase Shift Keying (QPSK). Alternatively, the modulation format can be 16-Quadrature Amplitude Modulation (QAM), or higher order QAM such as 64QAM. The modulation can be done with Orthogonal Frequency Division Multiplexing (OFDM). The modulation format can be changed during the operation of the optical transmitter 100 or at its startup according to a command signal provided for the optical transmitter 100.

Furthermore, the DSP 121 generates data by which to apply pre-equalization. For instance, the DSP 121 generates data for pre-equalization of a determined chromatic dispersion value according to the filter characteristic expressed in (6). The DSP 121 can also generate data for pre-equalization of impairments due to non-linear distortions appearing in the fiber into, which the lightwave signal 102 is launched.

The data output by the data selector 122 are fed into two Digital to Analog Converter (DAC) 123 and 124. The DAC 123 and 124 generate analog signals according to the outputs of the data selector 122. The analog signals generated by the DAC 123 and 124 are respectively amplified by driving amplifiers 125 and 126 so that each of their output voltage is suitable to drive the RF inputs of the IQ modulator 111.

A continuous wave signal is emitted by the laser 110 and fed into the input of the IQ modulator 111. A child I Mach-Zehnder Modulator (MZM) 112 of the IQ modulator 111 is driven by the output of the driving amplifier 125. A child Q MZM 113 of the IQ modulator 111 is driven by the output of the driving amplifier 126. A phase adjuster 114 controls the angle of quadrature of the IQ modulator 111. A low speed monitor Photo Diode (PD) 115 is integrated in the IQ modulator 111 and outputs a monitoring electrical signal proportional to the output of the IQ modulator 111. Alternatively, the monitor Photo Diode (PD) 115 can be provided outside the IQ modulator 111 and generate a monitor electrical signal by means of receiving the lightwave signal emitted by the IQ modulator 111 at a tapped portion.

The monitor signal generated by the monitor PD 115 is split by a divider 150. One of the signals split by the divider 150 is provided for the ABC circuit 130 which controls the DC biases of the IQ modulator 111. The ABC circuit 130 includes three control circuits 131, 132, and 133 to control respectively the DC bias of the child I MZM 112, the DC bias of the child Q MZM 113, and the DC bias of the phase adjuster 114 for setting the angle of quadrature. The ABC circuit 130 optimizes the DC biases of the IQ modulator 111 according to the monitor signal generated by the monitor PD 115. The ABC circuit 130 can be based on low frequency dither tones imprinted on the DC biases of the IQ modulator 111 and on the phase and amplitudes of the frequency components corresponding to the tone frequencies that are detected in the monitor signal generated by the monitor PD 115.

A general control unit 140 sets an ABC control unit 141 which can disable the control circuit 133 controlling the angle of quadrature of the IQ modulator 111. The ABC control unit 141 is also able to set the control circuit 133 in order to generate a specific DC bias determined by the general control unit 140. The general control unit 140 also controls a scan circuit 143 which generates several voltage values in order to set the angle of quadrature of the IQ modulator 111. A switch unit 151 is controlled by the general control unit 140. The output of the switch unit 151 is applied to the phase adjuster 114 to set the quadrature angle of the IQ modulator 111. The output of the switch unit 151 is either the DC bias generated by the control circuit 133 of the ABC circuit 130 or the DC voltage generated by the scan circuit 143, depending on its state.

When the switch unit 151 outputs the voltage generated by the scan circuit 143, the general control unit 140 orders a monitor record unit 142 to record the output value of the monitor PD 115 which is split by the divider 150, for each value of DC voltage generated by the scan circuit 143. The general control unit 140 is able to compare the voltages recorded by the monitor record unit 142, and to process DC voltages according to the compared values provided by the monitor record unit 142 and the voltages generated by the scan circuit 143 for each recorded monitor value. Moreover, the general control unit 140 can set the control circuit 133 to generate a voltage equal to the processed voltage through the ABC control unit 141.

Figure 2:
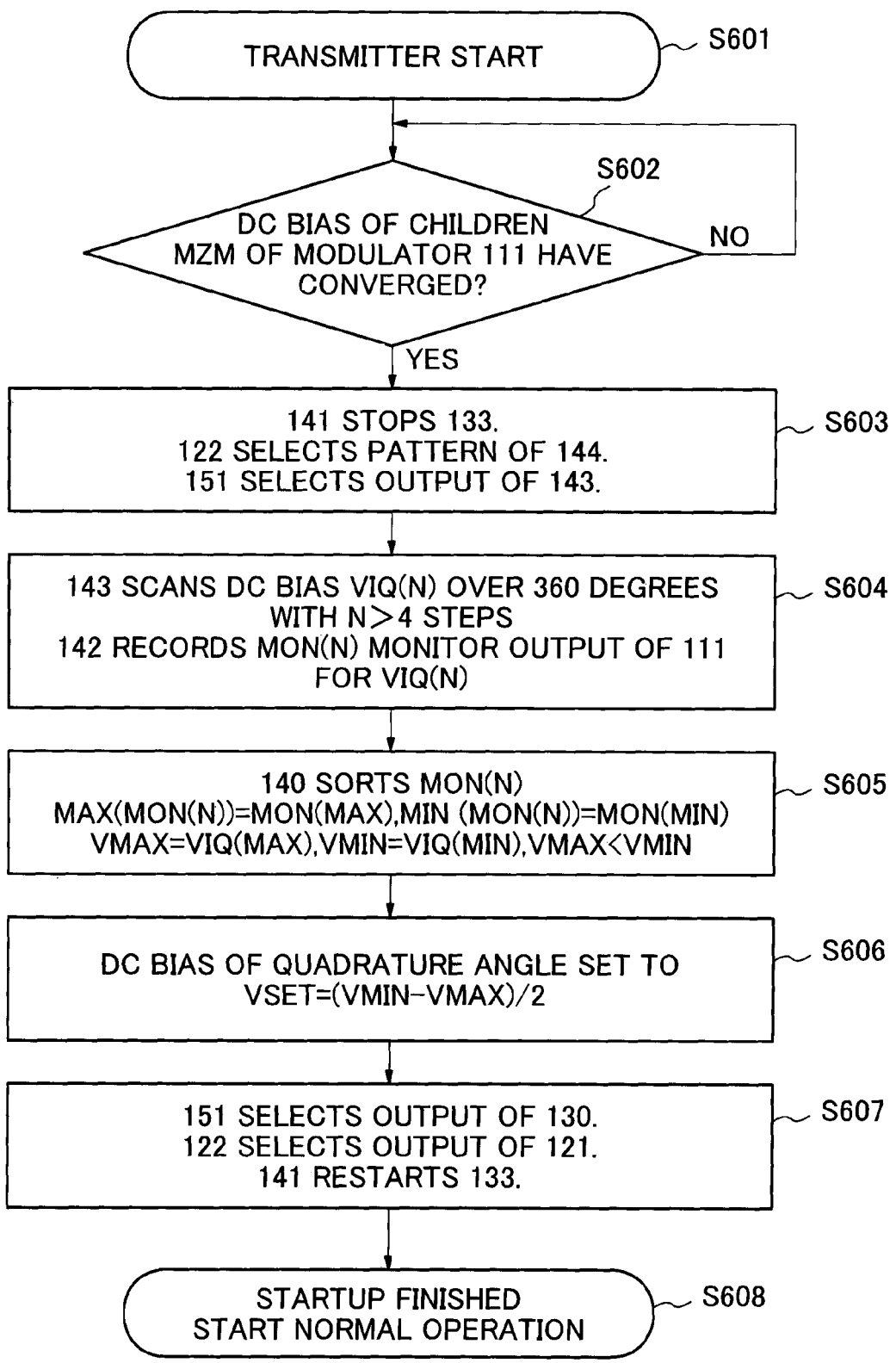
FIG. 2 is a flowchart showing a method for controlling the optical transmitter according to the first exemplary embodiment.

Next, it will be explained the way that the ambiguity on the DC biases of the IQ modulator is resolved according to this exemplary embodiment. FIG. 2 is a flowchart to control the optical transmitter 100 shown in FIG. 1 according to this exemplary embodiment. The optical transmitter 100 operates as defined by consecutive steps S601 to S608 at the start of the transmitter. When these steps have been completed, the DC biases of the IQ modulator 111 of the optical transmitter 100 are correctly set and the optical transmitter 100 emits lightwave signal with pre-equalization feature.

The DC biases of I and Q children MZM of the IQ modulator 111 have converged respectively according to the control circuits 131 and 132 to both Vpi (S602/YES).

The data selector 122 selects the training data generated by the training pattern generator 144. The switch unit 151 selects the output of the scan circuit 143 and the control circuit 133 is stopped (S603). Only the angle of quadrature is controlled without resolving the ambiguity on the DC biases of the MZM children.

The training patterns generated by the training pattern generator 144 are correlated and have a positive correlation. The data recorded by the monitor record unit 142, while the scan circuit 143 generates DC biases enabling to scan a quadrature angle over a range of 360 degrees, is similar to the curve of FIG. 3 (S604).

Figure 3:
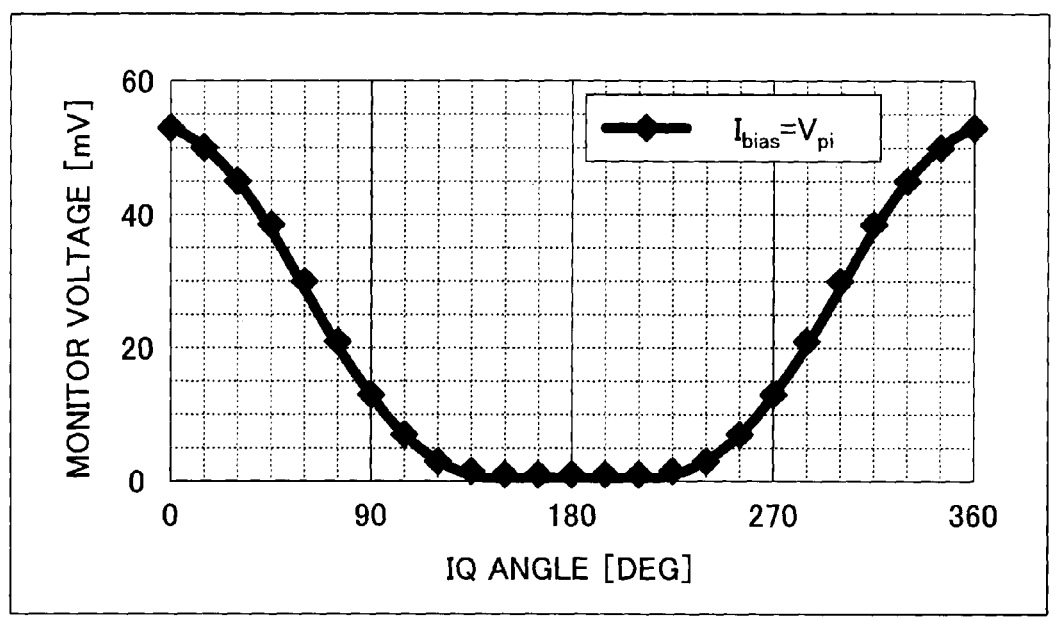
FIG. 3 is the result of a simulation for the monitor signal of an IQ modulator according to the first exemplary embodiment, with the DC bias of I children MZM converged to Vpi.

FIG. 3 is the result of a simulation for the monitor signal of an IQ modulator for different values of the quadrature angle using the IQ modulator according to this exemplary embodiment. The DC biases of I and Q children MZM have both converged to Vpi. In this configuration, the driving data for I and Q MZM are equal to an identical pattern. For the DC bias value Vmax corresponding to the quadrature angle equal to zero modulo 360 degrees, the monitor voltage is maximum. For the DC bias value Vmin corresponding to the quadrature angle equal to 180 degrees modulo 360 degrees, the monitor voltage is minimum. Accordingly, if Vmin>Vmax, the quadrature angle for the DC bias (Vmin−Vmax)/2 is close to 90 degrees, modulo 360 degrees.

By finding Vmax and Vmin to meet the condition of Vmin>Vmax and by setting DC bias for the quadrature angle to (Vmin−Vmax)/2, it is ensured that the quadrature angle is set to 90 degrees and that the IQ modulator is set to the case corresponding to the equation (2) (S605, S606).

Alternatively, one of the DC biases of I and Q children MZM of the IQ modulator has converged to Vpi, whereas the other has converged to 3*Vpi according to the respective control circuits 131 and 132. The training patterns generated by the training pattern generator 144 are correlated and have a positive correlation. The data recorded by the monitor record unit 142, while the scan circuit 143 generates DC biases enabling to scan a quadrature angle over a range of 360 degrees, is similar to the curve of FIG. 4.

Figure 4:
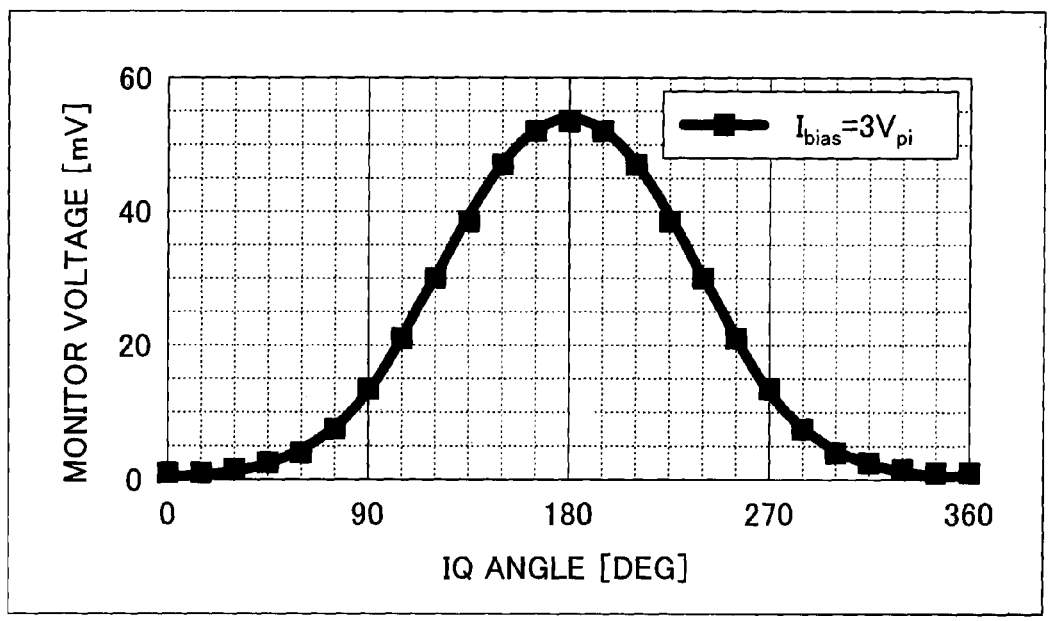
FIG. 4 is the result of a simulation for the monitor signal of an IQ modulator according to the first exemplary embodiment, with the DC bias of I children MZM converged to 3*Vpi.

FIG. 4 is the result of a simulation for the monitor signal of an IQ modulator for different values of the quadrature angle using the IQ Modulator according to this exemplary embodiment. The DC biases of I child MZM has converged to 3*Vpi and the DC bias of the Q child MZM has converged to Vpi. In this configuration, the driving data for I and Q MZM are equal to an identical pattern. For the DC bias value Vmin corresponding to the quadrature angle equal to zero modulo 360 degrees, the monitor voltage is minimum. For the DC bias value Vmax corresponding to the quadrature angle equal to 180 degrees modulo 360 degrees, the monitor voltage is maximum. Accordingly, if Vmin<Vmax, the quadrature angle for the DC bias (Vmax−Vmin)/2 is close to 90 degrees, modulo 360 degrees.

By finding Vmax and Vmin to meet the condition of Vmin>Vmax and by setting DC bias for the quadrature angle to (Vmin−Vmax)/2, it is ensured that the quadrature angle is set to 270 degrees. By combination of the equations (3) and (5), the IQ modulator is set to the case corresponding to the equation (2).

Alternatively, the training patterns can be chosen so that they have a negative but non-null correlation. In this case, by finding Vmax and Vmin to meet the condition of Vmin<Vmax and by setting DC bias for the quadrature angle to (Vmax−Vmin)/2, it is ensured that the IQ modulator is set to the case corresponding to the equation (2).

As mentioned above, according to the first exemplary embodiment, it becomes possible to optimally set the DC biases of the modulator and to optimally calculate the pre-equalized data. Moreover, it becomes possible to perform fast startups of optical transmitters, and the network including the optical transmitters does not need extra bandwidth.

Second Exemplary Embodiment

Figure 5:
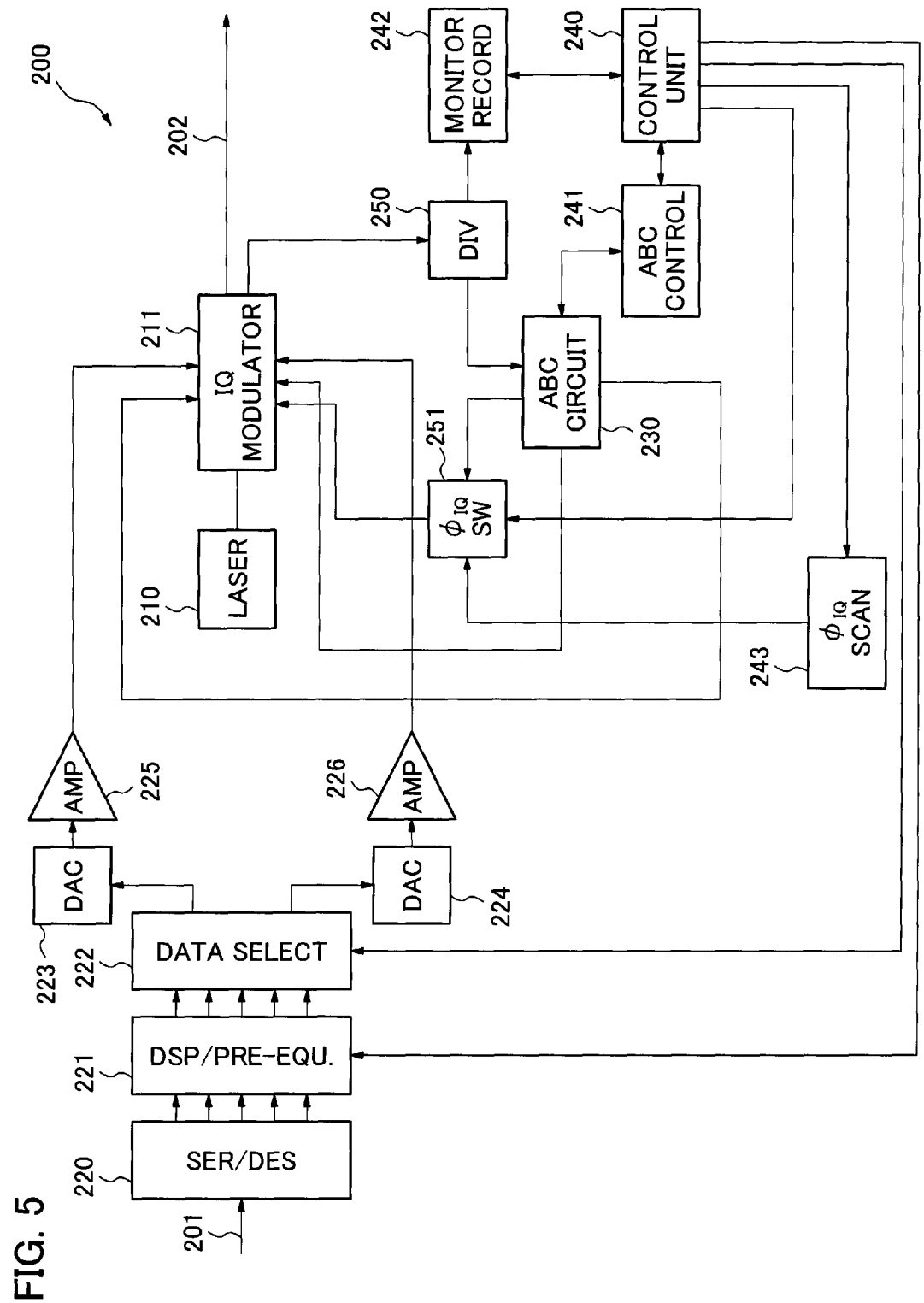
FIG. 5 is a schematic representation of an optical transmitter according to the second exemplary embodiment.

FIG. 5 is a schematic representation of an optical transmitter 200 including an IQ modulator 211 and an Auto Bias Control (ABC) circuit 230. The optical transmitter 200 emits a lightwave signal 202 modulated by the IQ modulator 211 according to the logical binary data stream 201. A serializer/deserializer 220 is identical to the serializer/deserializer 120 shown in FIG. 1. A DSP 221 is identical to the DSP 121. DAC 223 and 224, as well as driving amplifiers 225 and 226 are identical to the DAC 123, 124 and the driving amplifiers 125, 126, respectively. A laser 210, an IQ modulator 211, and an ABC circuit 230 are identical to the laser 110, the IQ modulator 111, and the ABC circuit 130, respectively. A monitor record unit 242 and a scan circuit 243 are identical to the monitor record unit 142 and the scan circuit 143, respectively. A divider 250 and a switch unit 251 are identical to the divider 150 and the switch unit 151, respectively.

A data selector 222 provides data processed by the DSP 221 for the DAC 223. According to the control signal generated by a general control unit 240, the signal provided for the DAC 224 by the data selector 222 is either the data processed by the DSP 221 or special data used for training. The special data is correlated to the data provided for the DAC 223. The special data can be equal to the data provided for the DAC 223. Alternatively, the special data can be equal to the opposite of the data provided for the DAC 223. Alternatively, the special data can be proportional to the data provided for the DAC 223. Alternatively, the special data can be proportional to the opposite of the data provided for the DAC 223.

The general control unit 240 sets an ABC control unit 241 which can disable the control circuit of the ABC circuit 230 controlling the quadrature angle of the IQ modulator 211. The general control unit 240 also controls the scan circuit 243. The switch unit 251 is controlled by the general control unit 240 in the same manner as the switch unit 151 is controlled by the general control unit 140.

When the switch unit 251 outputs the voltage generated by the scan circuit 243, the general control unit 240 orders the monitor record unit 242 to record the value output by the monitor PD in the IQ modulator 211 and split by the divider 250, for each value of DC voltage generated by the scan circuit 243. The general control circuit 240 is able to read the DC bias generated by the ABC circuit 230 to control the quadrature angle of the IQ modulator 211 through the ABC control unit 241. According to the read DC bias and to the voltages recorded by the monitor record unit 242 for each voltage generated by the scan circuit 243, the general control unit 240 can change the setting of the DSP 221. For instance, in the case where the DSP 221 pre-equalizes data for compensation of the chromatic dispersion, the general control unit 240 can change the sign of the compensated dispersion value.

Figure 6:
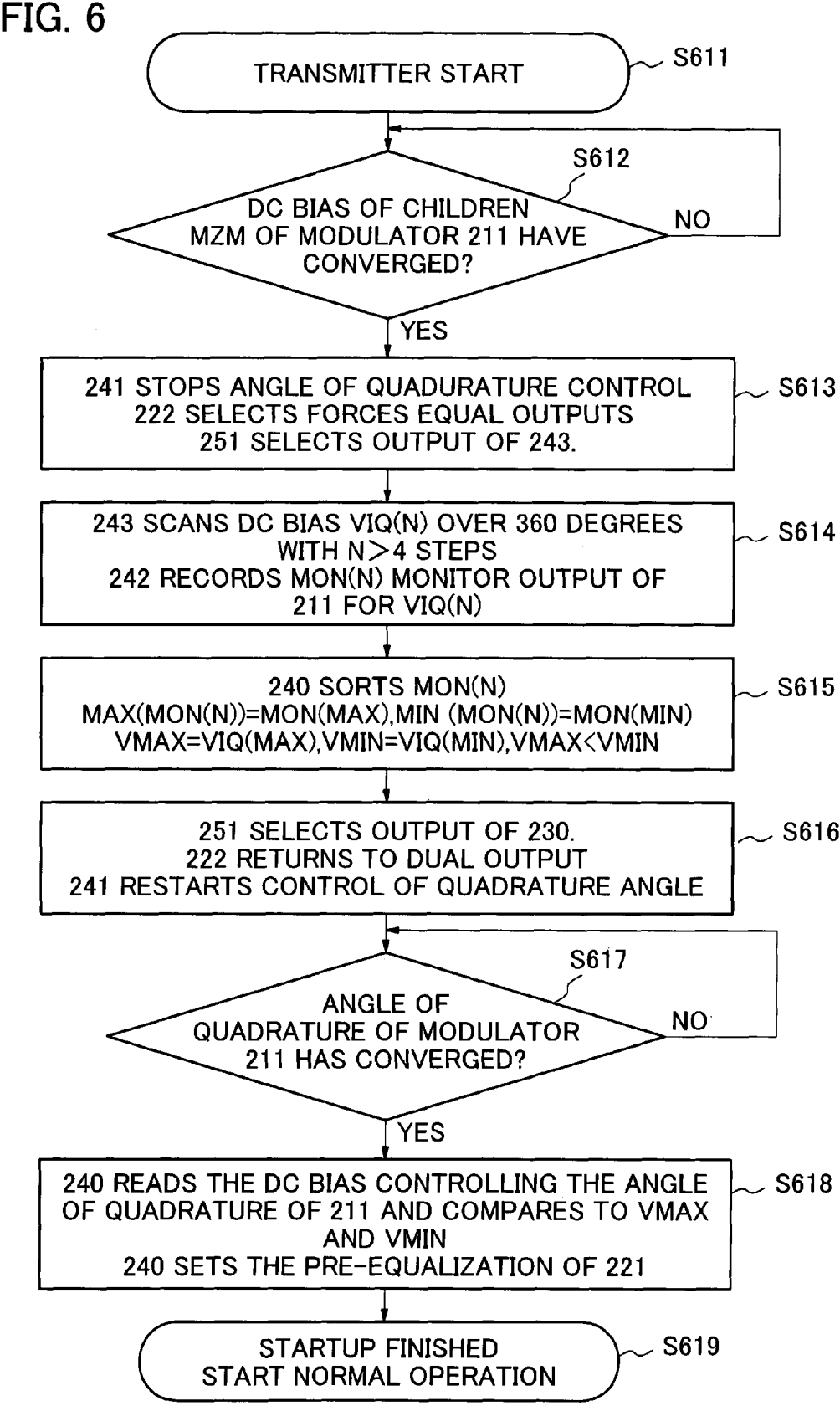
FIG. 6 is a flowchart showing a method for controlling the optical transmitter according to the second exemplary embodiment.

Next, it will be explained the way that the ambiguity on the DC biases of the IQ modulator is resolved according to this exemplary embodiment. FIG. 6 is a flowchart to control the optical transmitter 200 shown in FIG. 5 according to this exemplary embodiment. The optical transmitter 200 operates as defined by consecutive steps S611 to 619 at the start of the transmitter. When these steps have been completed, the DC biases of the IQ modulator 211 of the optical transmitter 200 are correctly set and the optical transmitter 200 emits lightwave signal with pre-equalization feature.

The DC biases of I and Q children MZM of the IQ modulator 211 have converged according to the ABC circuit 230 to both Vpi (S612/YES). The data driving I and Q children MZM of the IQ modulator 211 are chosen identical. The switch unit 251 selects the output of the scan circuit 243. The control of the quadrature angle of the IQ modulator 211 by the ABC circuit 230 is stopped (S613). Only the angle of quadrature is controlled without resolving the ambiguity on the DC biases of the MZM children.

The data recorded by the monitor record unit 242, while the scan circuit 243 generates DC biases enabling to scan a quadrature angle over a range of 360 degrees, is similar to the curve of FIG. 3 (S614). Then the switch unit 251 selects the output of the ABC circuit 230 and the control of the quadrature angle of the IQ modulator 211 by the ABC circuit 230 is enabled.

The general control unit 240 reads the DC bias setting the quadrature angle Vconv and compares it to the processed values Vmax and Vmin. If the condition of Vmin>Vconv>Vmax is met, the general control unit 240 verifies that the angle of quadrature is set to 90 degrees modulo 360 degrees. If the condition of Vmin<Vconv<Vmax is met, the unit general control 240 verifies that the angle of quadrature is set to 270 degrees modulo 360 degrees. Accordingly, the general control unit 240 sets the pre-equalization of DSP 221 to reverse the characteristics of the pre-equalization filter (S618). For instance, if the DSP is set to pre-equalize a chromatic dispersion "d", the general control unit 240 resets the DSP 221 to compensate a value of "−d".

Other cases of convergence for the DC biases of I and Q MZM are resolved in the same manner.

Third Exemplary Embodiment

Figure 7:
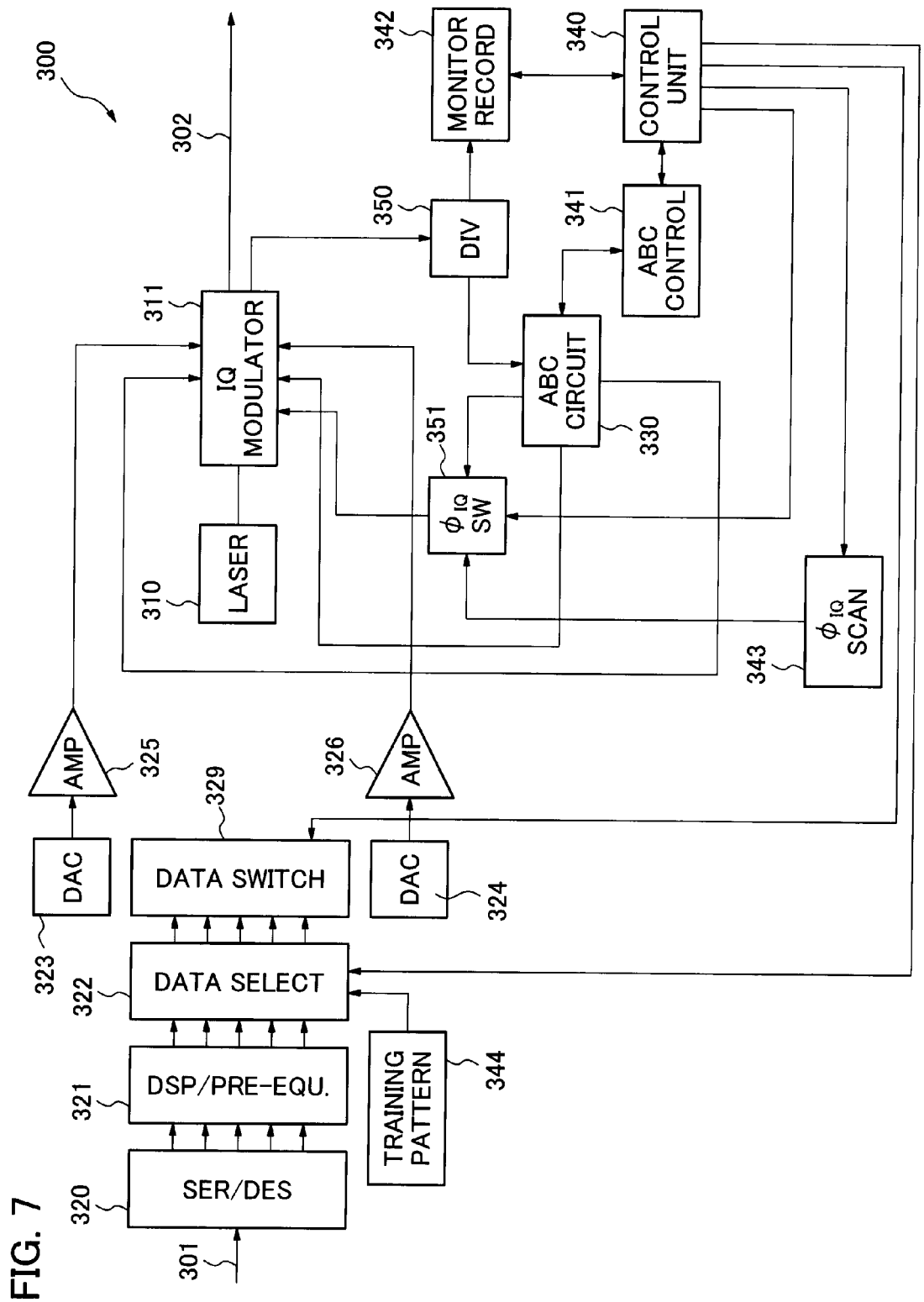
FIG. 7 is a schematic representation of an optical transmitter according to the third exemplary embodiment.

FIG. 7 is a schematic representation of an optical transmitter 300 including an IQ modulator 311 and an Auto Bias Control (ABC) circuit 330. The optical transmitter 300 emits a lightwave signal 302 modulated by the IQ modulator 311 according to a logical binary data stream 301. A serializer/deserializer 320 is identical to the serializer/deserializer 220 shown in FIG. 5. A DSP 321 and a data selector 322 are identical to the DSP 121 and the data selector 122 shown in FIG. 1, respectively. DAC 323 and 324 as well as driving amplifiers 325 and 326 are identical to the DAC 223, 224 and the driving amplifiers 225, 226, respectively.

A laser 310, IQ modulator 311, and ABC circuit 330 are identical to the laser 210, the IQ modulator 211, and the ABC circuit 230, respectively. An ABC control unit 341, a monitor record unit 342, a scan circuit 343, and a training pattern generator 344 are identical to the ABC control unit 241, the monitor record unit 242, the scan circuit 243, and the training pattern generator 144, respectively. A divider 350 and a switch unit 351 are identical to the divider 250 and the switch unit 251, respectively.

A general control unit 340 sets the ABC control unit 341, the monitor record unit 342, the scan circuit 343, and the switch unit 351 in the same manner as the general control unit 240 controls the ABC control unit 241, the monitor record unit 242, the scan circuit 243, and the switch unit 251, respectively. According to the read DC bias and to the voltages recorded by the monitor record unit 342 for each voltage generated by the scan circuit 343, the general control unit 340 can change the setting of a data switch 329 so that it either passes the data generated by the DSP 321 and selected by the data selector 322 directly to the DAC 323 and 324 or interchanges the data between the DAC 323 and 324.

Figure 8:
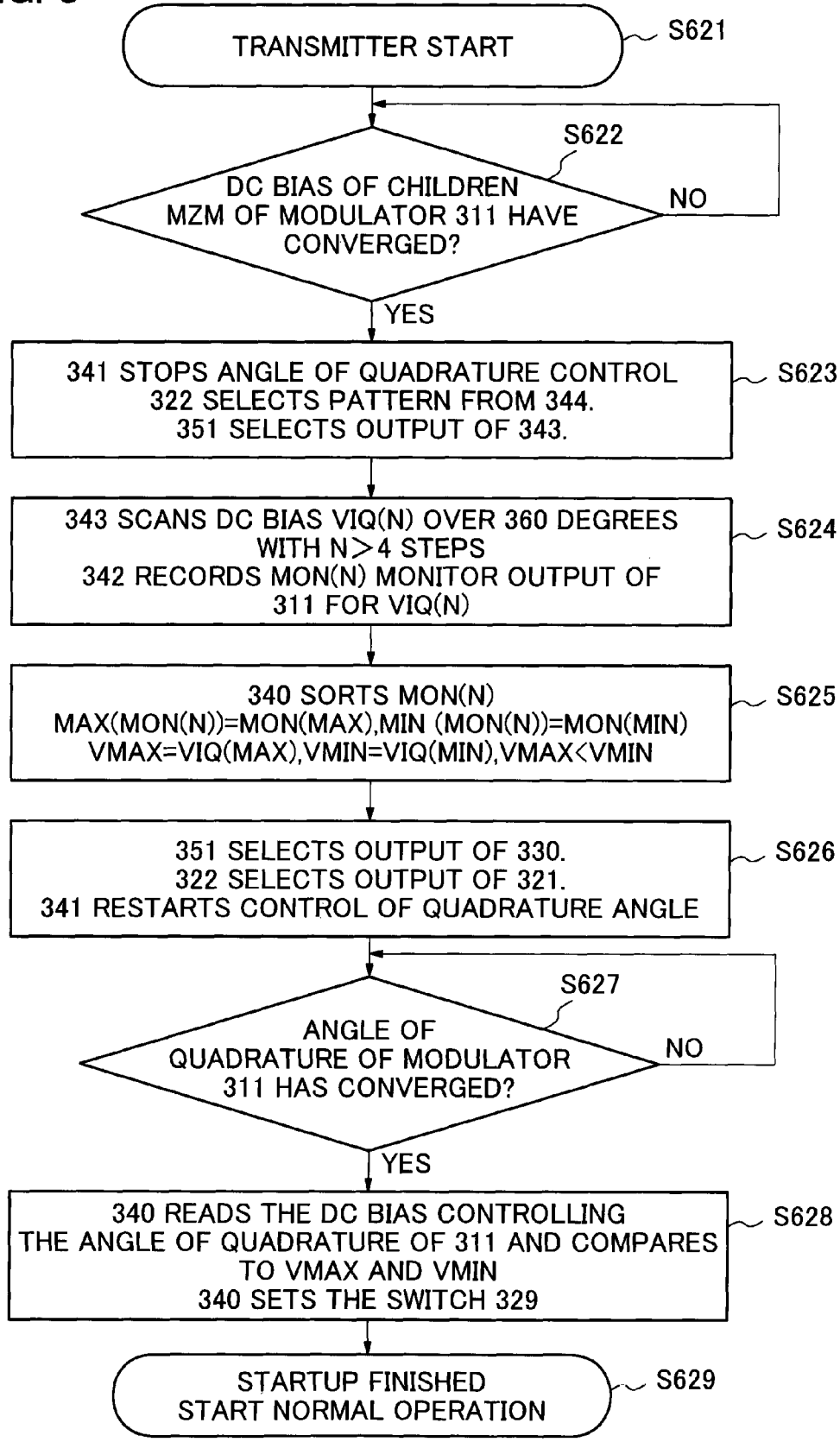
FIG. 8 is a flowchart showing a method for controlling the optical transmitter according to the third exemplary embodiment.

Next, it will be explained the way that the ambiguity on the DC biases of the IQ modulator is resolved according to this exemplary embodiment. FIG. 8 is a flowchart to control the optical transmitter 300 shown in FIG. 7. The optical transmitter 300 operates as defined by the consecutive steps S621 to S629 at the start of the transmitter. When these steps have been completed, the DC biases of the IQ modulator 311 in the optical transmitter 300 are correctly set and the optical transmitter 300 emits lightwave signal with pre-equalization feature.

The DC biases of I and Q children MZM in the IQ modulator 311 have converged to both Vpi according to the ABC circuit 330 (S622/YES). The data selector 322 selects the training data generated by the training pattern generator 344. The switch unit 351 selects the output of the scan circuit 343. And control of the quadrature angle of the IQ modulator 311 by the ABC circuit 330 is stopped (S623). Only the angle of quadrature is controlled without resolving the ambiguity on the DC biases of the MZM children.

The data recorded by the monitor record unit 342, while the scan circuit 343 generates DC biases enabling to scan a quadrature angle over a range of 360 degrees, is similar to the curve of FIG. 3 (S624). Then the switch unit 351 selects the output of the ABC circuit 330 and the control of the quadrature angle of the IQ modulator 311 by the ABC circuit 330 is enabled.

The general control unit 340 reads the DC bias setting the quadrature angle Vconv and compares it to the processed values Vmax and Vmin. If the condition of Vmin>Vconv>Vmax is met, the general control unit 340 verifies that the quadrature angle is set to 90 degrees modulo 360 degrees (S625). If the condition of Vmin<Vconv<Vmax is met, the general control unit 340 verifies that the quadrature angle is set to 270 degrees modulo 360 degrees. Accordingly, the general control unit 340 sets the data switch 329 in order to interchange the driving data provided for the DAC 323 and 324 (S628). Other cases of convergence for the DC biases of I and Q MZM are resolved in the same manner.

Figure 9:
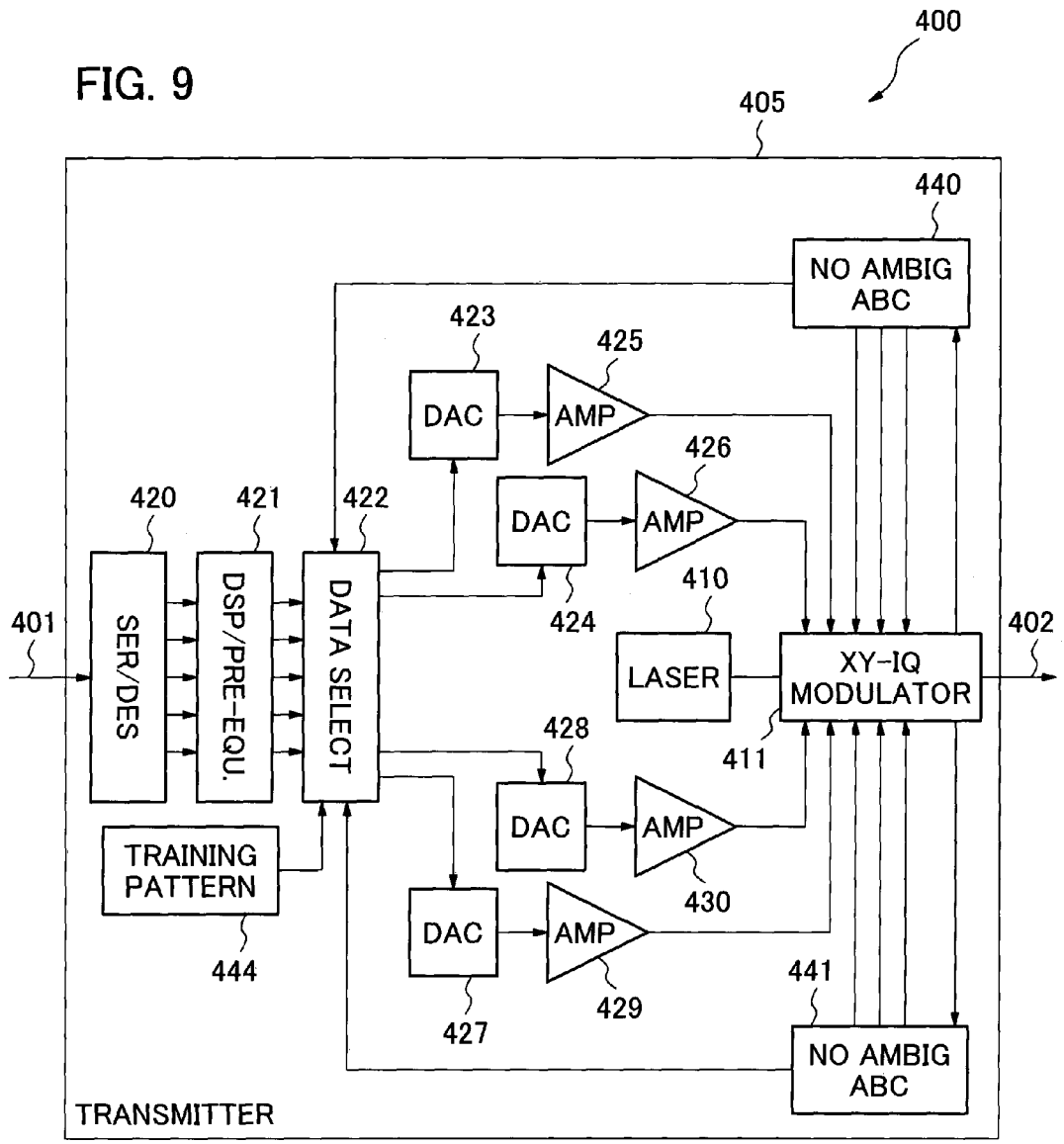
FIG. 9 is a schematic representation of an optical transponder according to the third exemplary embodiment.
Figure 9:
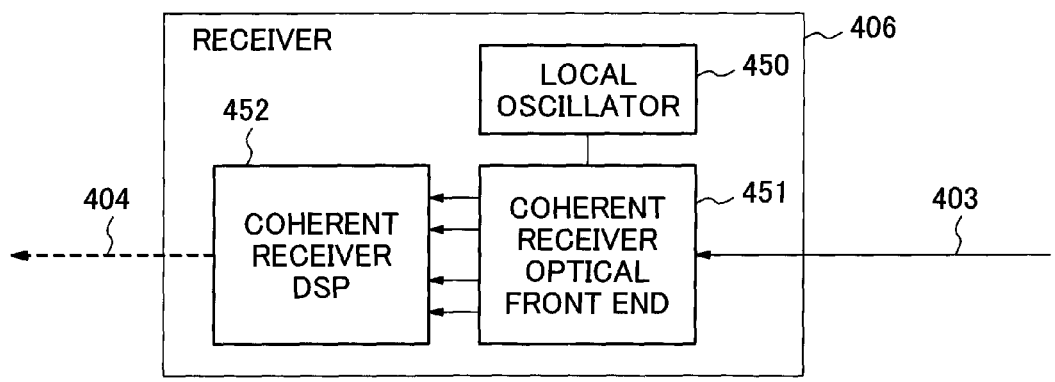

FIG. 9 is a schematic representation of an optical transponder 400 including an optical transmitter 405 and an optical receiver 406. The optical transmitter 405 emits a lightwave signal 402 modulated by a polarization multiplexed IQ modulator 411 according to the logical binary data stream 401. The optical receiver 406 generates a binary data stream 404 according to a received lightwave signal 403.

The optical transmitter 405 includes the polarization multiplexed IQ modulator 411. The polarization multiplexed IQ modulator 411 is equivalent to two IQ modulators identical to the IQ modulator 111 for each polarization, and has a polarization multiplexing function for the modulated lightwave for each of the polarization.

A serializer/deserializer 420, DSP 421, and a data selector 422 are equivalent to the serializer/deserializer 120, DSP 121, and the data selector 122, respectively. They treat twice information included by the polarization multiplexed lightwave signal 402. DAC 423, 424, 427, and 428 are identical to the DAC 123. Driving amplifiers 424, 425, 429, and 430 are identical to the driving amplifier 125. A laser 410 and a training pattern generator 444 are identical to the laser 110 and the training pattern generator 144, respectively. Ambiguity free ABC circuits 440 and 441 are identical. They include equivalent functions and circuits to the ABC circuit 130, the general control unit 140, the ABC control unit 141, the scan circuit 143, the monitor record unit 142, the divider 150, and switch unit 151.

The receiver 406 is equipped with an optical front end 451. The optical front end 451 includes an optical hybrid with polarization multiplexing, balanced photo detectors, and trans-impedance amplifiers. The optical front end 451 receives the received lightwave signal 403 and mixes it with the continuous lightwave emitted by a local oscillator 450 for coherent reception. The four differential outputs from the optical front end 451 are connected to a receiver chip 452, which integrates high speed Analog to Digital Converters (ADC), DSP, and serializer/deserializer. The DSP integrated in the receiver chip 452 has function of electrical filtering, chromatic dispersion compensation, adaptive equalization, polarization de-multiplexing, carrier phase estimation, and decision. The signal recovered and re-serialized by the DSP in the receiver chip 452 is output as the binary data stream 404.

Figure 10:
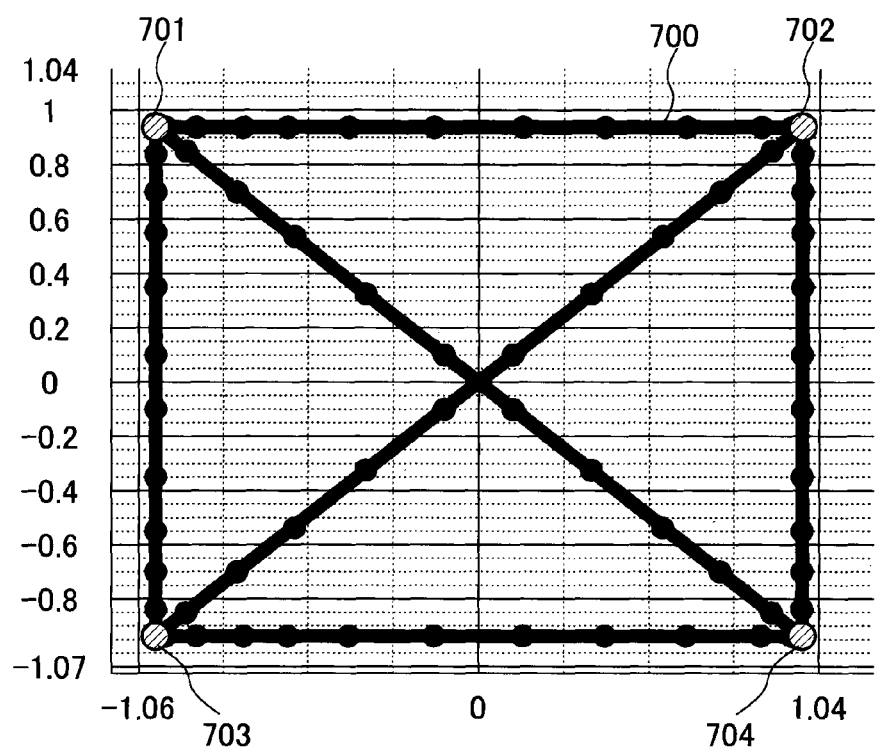
FIG. 10 is the simulation results of the output signal from the optical transponder according to the third exemplary embodiment.

FIG. 10 is the simulation results of the output signal of the X polarization of the optical transponder 400 shown in FIG. 9. The modulation format is chosen as Polarization Multiplexed QPSK (PM-QPSK) with a baud rate of 12.5 GBaud. The pre-equalization in the optical transmitter 405 is set to pre-equalize a chromatic dispersion of 10,000 ps/nm. The constellation 700 is measured after transmission for 500 km through a fiber with chromatic dispersion of 20 ps/nm/km. The residual dispersion is null at this point. The constellation 700 has clearly four symbols 701, 702, 703, and 704 of the QPSK signal. Such signal can be recovered without error by an optical receiver similar to the optical receiver 406.

Figure 11:
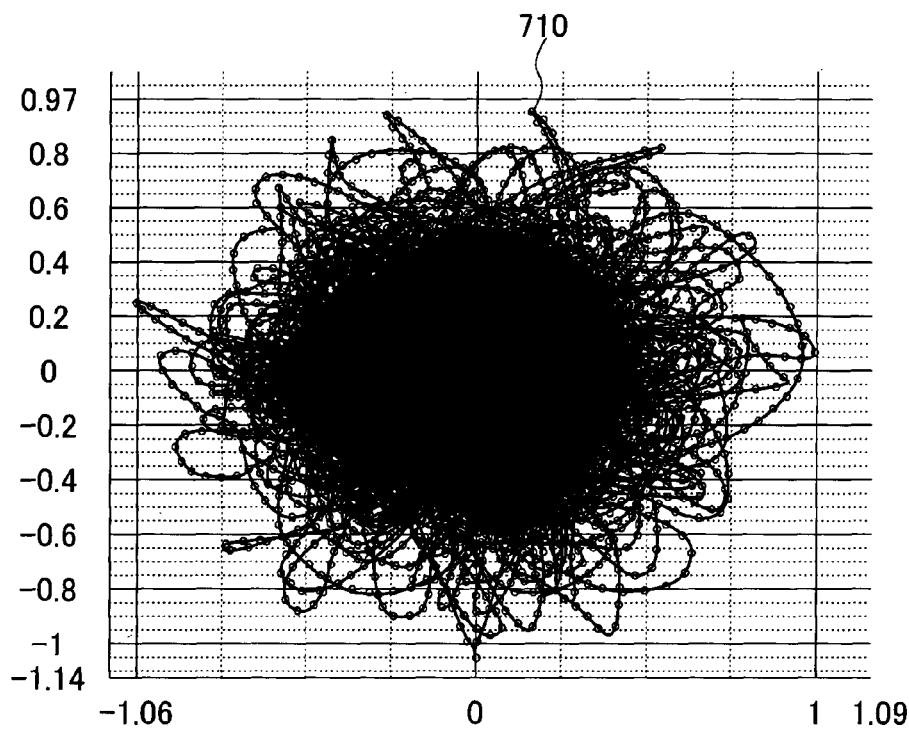
FIG. 11 is the simulation results of the output signal from a conventional optical transponder.

In the same conditions and by using a conventional method, due to the ambiguity of the DC biases of the IQ modulators controlled by ABC circuit, the emitted signal is susceptible to the conditions of equations (3), (4), or (5). As shown in FIG. 11, in the case of signal emitted by an optical transponder similar to the optical transponder 400 with a conventional method, the related constellation 710 represents the signal when the IQ modulator obeys the condition of equation (3). The residual chromatic dispersion is 20,000 ps/nm after transmission for, 500 km. This signal exceeds the capacity for compensating by the DSP in the receiver chip 452. Therefore, by using a conventional method, the reception of the signal is not possible in this configuration.

As mentioned above, according to these exemplary embodiments, it becomes possible to control an IQ modulator which emits a modulated lightwave signal featured by pre-equalization, which a receiver can receive optimally. The controlled IQ modulator has DC biases set according to the pre-equalization settings.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

This invention can be applied to an optical communication system which utilizes pre-equalization technique.

REFERENCE SIGNS LIST 100, 200, 300, 405 optical transmitter
101, 201, 301, 401 logical binary data stream
102, 202, 302, 402 lightwave signal
110, 210, 310, 410 laser
111, 211, 311 IQ modulator
112 child I MZM
113 child Q MZM
114 phase adjuster
115 monitor PD
120, 220, 320, 420 serializer/deserializer
121, 221, 321, 421 DSP
122, 222, 322, 422 data selector
123, 124, 223, 224, 323, 324, 423, 424, 427, 428 DAC
125, 126, 225, 226, 325, 326, 424, 425, 429, 430 driving amplifier
130, 230, 330 ABC circuit
131, 132, 133 control circuit
140, 240, 340 general control unit
141, 241, 341 ABC control unit
142, 242, 342 monitor record unit
143, 243, 343 scan circuit
144, 344, 444 training pattern generator
150, 250, 350 divider.
151, 251, 351 switch unit
329 data switch
400 optical transponder
403 received lightwave signal
404 binary data stream
406 optical receiver
411 polarization multiplexed IQ modulator
440, 441 ambiguity free ABC circuit
450 local oscillator
451 optical front end
452 receiver chip
700 constellation
701, 702, 703, 704 symbol
710 related constellation

The invention claimed is:

1. A method for controlling an optical transmitter, comprising the steps of:
   (a) making direct current biases for driving children Mach-Zehnder modulators of an IQ modulator in the optical transmitter converge to values close to null driving points of the children Mach-Zehnder modulators;
   (b) driving the children Mach-Zehnder modulators with special driving data including a pair of training patterns between which there is a significant correlation;
   (c) scanning direct current biases for setting quadrature angle of the IQ modulator;
   (d) monitoring output of the IQ modulator during step (c);
   (e) setting the direct current bias for setting quadrature angle on the basis of the driving data and monitored results in step (d); and
   interchanging the driving data between the children Mach-Zehnder modulators of the IQ modulator, depending on the direct current bias for setting the quadrature angle set in step (e).

2. An optical transmitter, comprising:
   an IQ modulator provided with children Mach-Zehnder modulators;
   an auto bias control circuit making direct current biases for driving the children Mach-Zehnder modulators converge to values close to null driving points of the children Mach-Zehnder modulators;
   a data selector selecting special driving data including a pair of training patterns between which there is a significant correlation, for driving the children Mach-Zehnder modulators;
   a scan circuit scanning direct current biases for setting quadrature angle of the IQ modulator;
   a monitor photo diode monitoring output of the IQ modulator during scanning direct current biases for setting the quadrature angle;
   a control circuit setting the direct current bias for setting the quadrature angle on the basis of the driving data and results monitored by the monitor photo diode; and
   a data switch interchanging the driving data between the children Mach-Zehnder modulators of the IQ modulator, depending on the direct current bias for setting the quadrature angle.

3. A method for controlling an optical transmitter, comprising the steps of:
   (a) making direct current biases for driving children Mach-Zehnder modulators of an IQ modulator in the optical transmitter converge to values close to null driving points of the children Mach-Zehnder modulators;
   (b) driving the children Mach-Zehnder modulators with special driving data including a pair of training patterns between which there is a significant correlation;
   (c) scanning direct current biases for setting quadrature angle of the IQ modulator;
   (d) monitoring output of the IQ modulator during step (c);
   (e) setting the direct current bias for setting quadrature angle on the basis of the driving data and monitored results in step (d); and
   interchanging the driving data between the children Mach-Zehnder modulators of the IQ modulator, depending on the direct current bias for setting the quadrature angle set in step (e),
   wherein the training patterns of step (b) have a correlation selected from strictly positive correlation and strictly negative correlation.

4. A method for controlling an optical transmitter, comprising the steps of:
   (a) making direct current biases for driving children Mach-Zehnder modulators of an IQ modulator in the optical transmitter converge to values close to null driving points of the children Mach-Zehnder modulators;
   (b) driving the children Mach-Zehnder modulators with special driving data including a pair of training patterns between which there is a significant correlation;
   (c) scanning direct current biases for setting quadrature angle of the IQ modulator;
   (d) monitoring output of the IQ modulator during step (c);
   (e) setting the direct current bias for setting quadrature angle on the basis of the driving data and monitored results in step (d); and
   interchanging the driving data between the children Mach-Zehnder modulators of the IQ modulator, depending on the direct current bias for setting the quadrature angle set in step (e), wherein both of the children Mach-Zehnder modulators are driven with the same electrical signal generated from binary data to be modulated on optical data.

5. A method for controlling an optical transmitter, comprising the steps of:
(a) making direct current biases for driving children Mach-Zehnder modulators of an IQ modulator in the optical transmitter converge to values close to null driving points of the children Mach-Zehnder modulators;
(b) driving the children Mach-Zehnder modulators with special driving data including a pair of training patterns between which there is a significant correlation;
(c) scanning direct current biases for setting quadrature angle of the IQ modulator;
(d) monitoring output of the IQ modulator during step (c);
(e) setting the direct current bias for setting quadrature angle on the basis of the driving data and monitored results in step (d); and
interchanging the driving data between the children Mach-Zehnder modulators of the IQ modulator, depending on the direct current bias for setting the quadrature angle set in step (e), wherein, in step (b), the special driving data includes data generated for pre-equalization.

6. An optical transmitter, comprising:
an IQ modulator provided with children Mach-Zehnder modulators;
an auto bias control circuit making direct current biases for driving the children Mach-Zehnder modulators converge to values close to null driving points of the children Mach-Zehnder modulators;
a data selector selecting special driving data including a pair of training patterns between which there is a significant correlation, for driving the children Mach-Zehnder modulators;
a scan circuit scanning direct current biases for setting quadrature angle of the IQ modulator;
a monitor photo diode monitoring output of the IQ modulator during scanning direct current biases for setting the quadrature angle;
a control circuit setting the direct current bias for setting the quadrature angle on the basis of the driving data and results monitored by the monitor photo diode; and
a data switch interchanging the driving data between the children Mach-Zehnder modulators of the IQ modulator, depending on the direct current bias for setting the quadrature angle, wherein the training patterns have a correlation selected from strictly positive correlation and strictly negative correlation.

* * * * *